United States Patent [19]
Johnson et al.

[11] Patent Number: 5,156,052
[45] Date of Patent: Oct. 20, 1992

[54] RIBBED AND BOSSED PRESSURE TRANSDUCER

[75] Inventors: Ralph H. Johnson, Plano; John R. Hines, Richardson, both of Tex.

[73] Assignee: Honeywell Inc., Minneapolis, Minn.

[21] Appl. No.: 630,687

[22] Filed: Dec. 20, 1990

[51] Int. Cl.$^5$ ............................ G01L 7/08; G01L 9/06
[52] U.S. Cl. ..................... 73/727; 29/621.1; 73/721; 338/4; 338/42
[58] Field of Search ............... 73/721, 727, 720, 726, 73/115, DIG. 4, 754, 756, 862.65, 862.66, 767; 338/4, 42; 29/621.1

[56] References Cited

U.S. PATENT DOCUMENTS

| | | | |
|---|---|---|---|
| 3,869,906 | 3/1975 | Andersson | 73/726 |
| 4,545,255 | 10/1985 | Pugnaire | 73/727 |
| 4,570,498 | 2/1986 | Okayama | 73/726 |

FOREIGN PATENT DOCUMENTS

| | | | |
|---|---|---|---|
| 0404673 | 12/1990 | European Pat. Off. | 73/720 |
| 3336094 | 4/1985 | Fed. Rep. of Germany | 73/720 |
| 0063829 | 3/1987 | Japan | 73/720 |

OTHER PUBLICATIONS

Yasukawa et al., "Simulation of Circular Silicon Pressure Sensors with a Center Boss for Very Low Pressure Measurement" IEEE Transaction on Electron Devices, vol. 36, No. 7, Jul. 1989.

Primary Examiner—Donald O. Woodiel
Attorney, Agent, or Firm—Robert B. Leonard

[57] ABSTRACT

A pressure transducer having means for improving the linearity and sensitivity of an output signal from the pressure transducer. Ribs and bosses are introduced in the diaphragm region to collect the moments caused by a difference in pressure on the two sides of the diaphragm and thus improve device sensitivity. In addition, the ribs and bosses prevent stretching of the piezoresistors thus improving the linearity of the device. A constraint can also be included to improve the alignment of the piezoresistors thus improving the linearity of the device.

10 Claims, 8 Drawing Sheets

RIBBED AND BOSSED PRESSURE TRANSDUCER

BACKGROUND OF THE INVENTION

This invention relates to the field of piezoresistive transducers, and more specifically to pressure transducers having piezoresistors in a bridge arrangement.

Pressure transducers which used piezoresistors in a bridge arrangement are well known in the art. Generally, a silicon substrate was formed and epitaxial layer was grown on the substrate. Resistors were then diffused into the epitaxial layer. Lastly, a portion of the substrate was etched away to leave a thin diaphragm, formed from the epitaxial layer, and a supporting rim. The piezoresistors were located such as to be in the area unsupported by the rim. The end result was a pressure transducer.

To use the transducer, a first and second pressures were exposed to the diaphragm, one on each side. The diaphragm would then deflect in an amount proportional to the difference between the first and second pressures. The deflection, in turn, caused bending of the piezoresistors. This bending of the piezoresistors caused changes in their resistance value, which was reflected as a change in the output voltage signal of the resistive bridge.

Three problems existed with the pressure transducers of the prior art. First, alignment of required regions on the diaphragm was difficult. Resistors needed to be placed at exact locations on the diaphragm. Misalignment of the resistors affected the relationship between the pressure being measured and the accuracy of the output signal from the transducer.

Second, the sensitivity of the prior art pressure transducer suffered because the diaphragm was not effective in transferring the full amount of the deflection to the region of the piezoresistors. Thus, small deflections of the diaphragm did not cause a change in the resistance of the piezoresistors and was therefore not reflected in the output voltage signal of the resistive bridge.

The third problem was that the linearity of the output voltage signal was poor due to pressure variable stretching of the diaphragm in the vicinity of the piezoresistors. This stretching caused a loss of transfer of the deflection to the piezoresistors which thereby caused the non-linearity in the output voltage signal.

Thus, it is an object of the present invention to improve the relationship of the pressure being sensed to the accuracy of the output signal. It is another object of the present invention to improve the sensitivity of piezoresistive pressure transducers. It is yet a further object of the present invention to improve the linearity of piezoresistive pressure transducers.

SUMMARY OF THE INVENTION

The present invention is a piezoresistive pressure transducer which accomplishes the above desired objectives. The pressure transducer is formed from a constraint, a diaphragm, a plurality of bosses, plurality of ribs and a plurality of piezoresistors. The constraint forms the support rim of the pressure transducer and has a central region. A diaphragm having a first thickness is formed in the central region. A plurality of bosses of a second thickness are connected to the diaphragm. A rib having a third thickness less than or equal to the second thickness but greater than or equal to the first thickness connects the boss to the constraint. At least one piezoresistor is formed in each rib.

The use of the constraint improves alignment of regions being placed on the diaphragm. The bosses and ribs improve the sensitivity of the devices by collecting the moments caused by deflection of the diaphragm at the resistors. The linearity of the device is also improved by selecting a boss geometry which minimizes stretching at the point of the piezoresistors.

DETAILED DESCRIPTION OF THE PREFERRED EMBODIMENTS

The invention can be better understood with reference to the accompanying Figures wherein like reference numbers are used to show like elements.

Figure 1A:
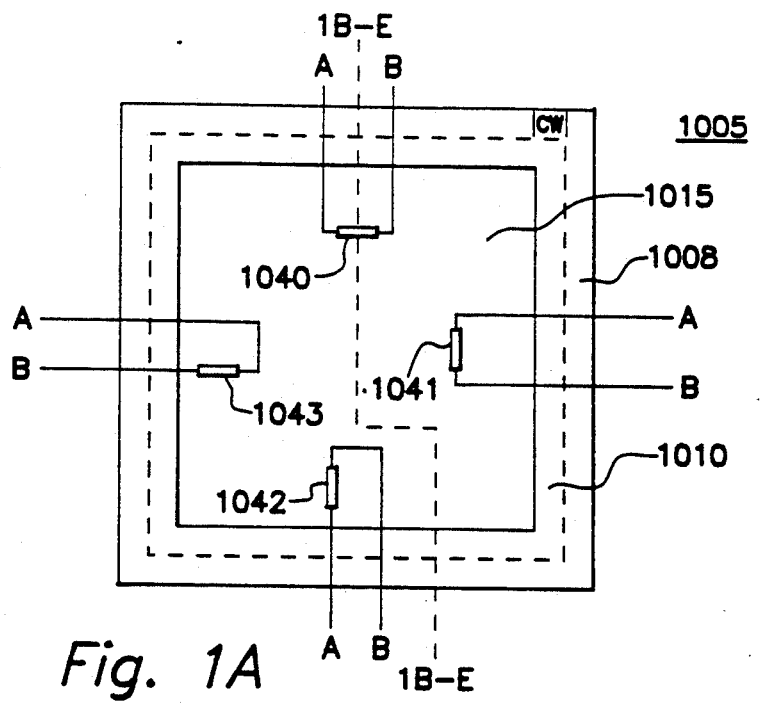
FIG. 1A is a top view of a first embodiment of the inventive pressure transducer.

Referring now to FIG. 1A, thereshown is a pressure transducer 1005 having a support rim 1008, a constraint 1010, a diaphragm 1015, four resistors 1040, 1041, 1042 and 1043 and four sets of leads A,B. The formation of such a pressure transducer will now be described.

Figure 1B:
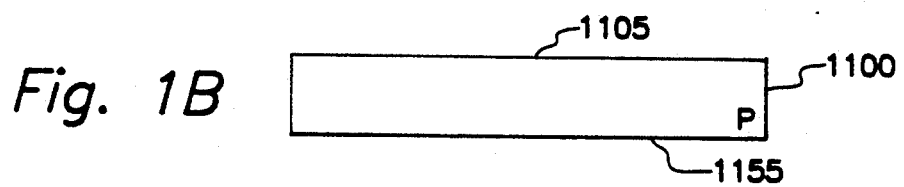
FIGS. 1B-E are side views taken along line 1B-E—1B-E which show the method of construction of the pressure transducer of FIG. 1A.

To form a pressure transducer as shown in FIG. 1A, the steps depicted in FIGS. 1B-E are followed. FIG. 1B shows the formation of a substrate 1100 having a surface 1105. The substrate 1100 is formed here from silicon doped with a Periodic Chart group three element such as Boron to constitute P type material.

Figure 1C:
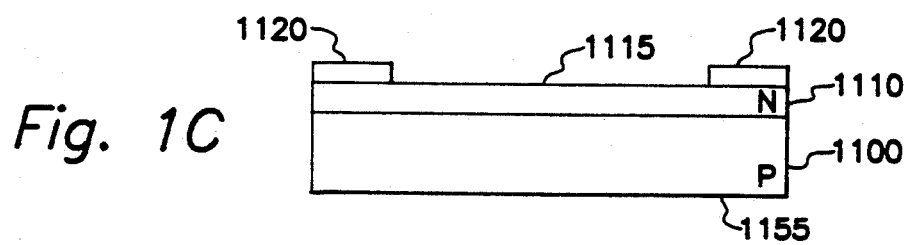
Figure 1D:
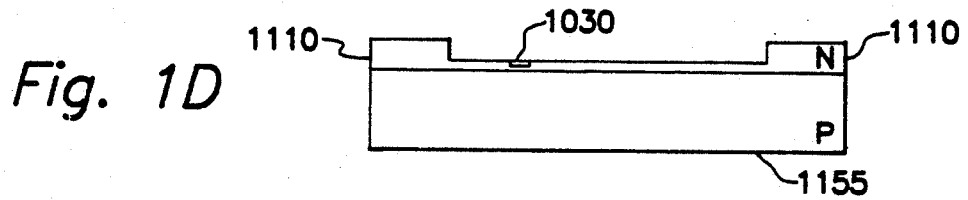

In FIG. 1C, a first layer of N type silicon 1110 having surface 1115 is attached to surface 1105 of the substrate 1100. The first layer can be formed, for example, by epitaxial growth or wafer to wafer bonding. The N type silicon is made by doping pure silicon with a Periodic Chart group 5 element such as Phosphorus. Next, a mask 1120 is placed on surface 1115. The mask will prevent etching of surface 1115 during the next step. Surface 1115 is then etched using, for example, a timed Potassium Hydroxide (KOH) etchant. Any area of surface 1115 not covered by the mask 1120 is etched away. The depth of the etch can be controlled by controlling the length of time the etchant is allowed to interact with surface 1115. The structure after this etch is shown in FIG. 1D. In addition, FIG. 1D shows a piezoresistor 1040 as having been diffused into a remaining portion of first layer 1110.

Figure 1E:
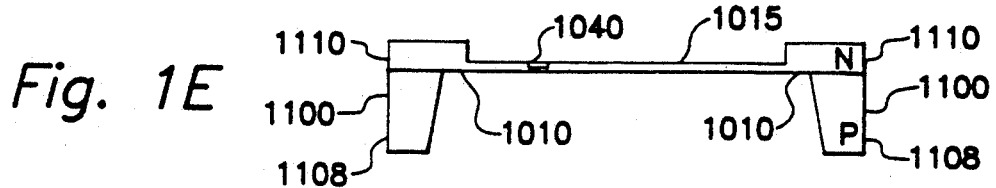

As a final step, a portion of substrate 1100 is etched away producing the device shown in FIG. 1E. The constraint 1010, diaphragm 1015, support rim 1008 and resistor 1040 can now be seen from this side view.

Figure 2A:
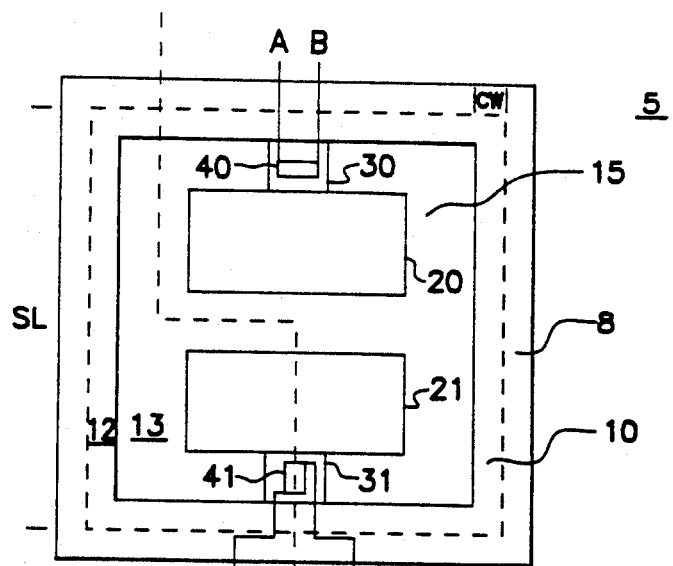
FIG. 2A is a top view of a second embodiment of the inventive pressure transducer.

Shown in FIG. 2A is a second embodiment of the inventive pressure transducer 5. Pressure transducer 5 is comprised of a support rim 8, constraint 10, a diaphragm 15, bosses 20, 21, ribs 30, 31 and piezoresistors 40, 41. The constraint has an edge region 12 and a central region 13. The diaphragm 15 stretches across the central region 13 and in combination with the bosses 20, 21 and the ribs 30, 31, completely cover the central region. The diaphragm is formed to have a first thickness.

The bosses 20 and 21 are formed to be in contact with the diaphragm 15 and the ribs 30, 31 and are formed to have a second thickness greater than the first thickness.

Figure 6:
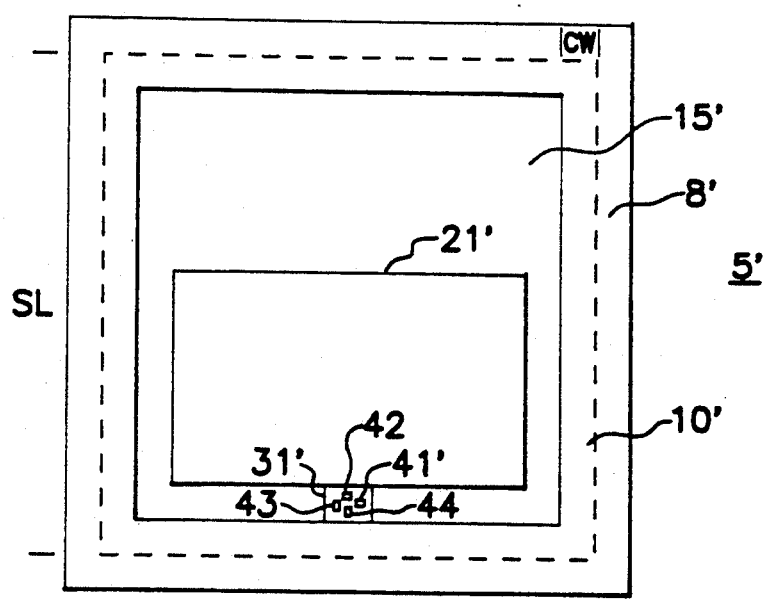
FIG. 6 is a top view of a pressure transducer of the present invention having one rib but plural resistors.

The ribs 30, 31 are formed so that each contacts one boss, either 20 or 21 and the edge region 12 of the constraint 10. The ribs 30, 31 are formed to have a third thickness which is greater than the first thickness but less than or equal to the second thickness. Inside the ribs 30, 31 are piezoresistors 40, 41. Piezoresistors 40, 41 change resistance when deformed from normal shape. Each resistor can be connected to an outside circuit through leads A and B. It is also possible to place many resistors into one rib, and thus create a resistive bridge from a pressure transducer design having only one rib and one boss. See FIG. 6.

Figure 2B:
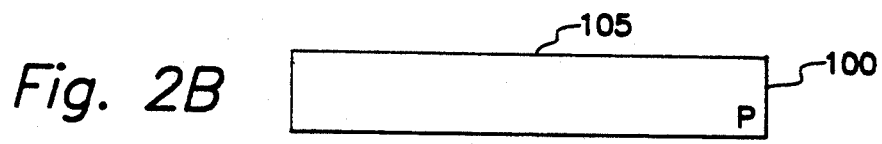
FIGS. 2B-D are side views taken along line 2B-D—2B-D which show the method of construction of the pressure transducer of FIG. 2A.
Figure 2C:
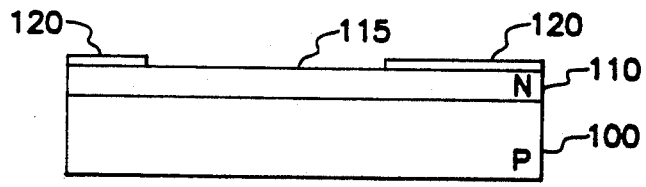
Figure 2D:
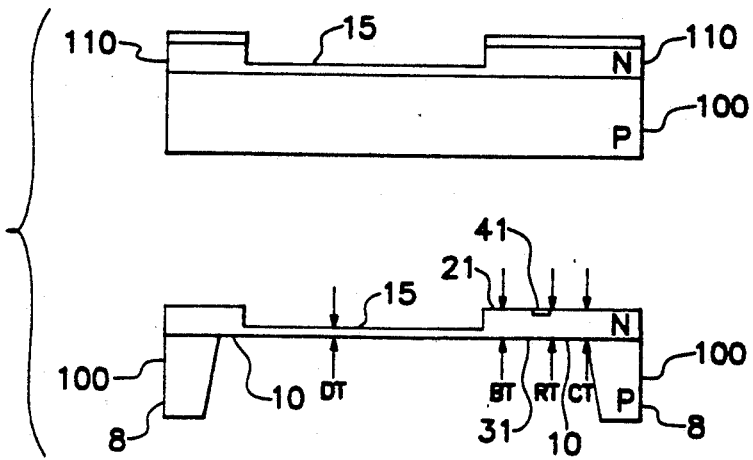

To form a pressure transducer as shown in FIG. 2A, the steps depicted in FIGS. 2B-D are followed. FIG. 2B shows the formation of a substrate 100 having a surface 105.

In FIG. 2C, a first layer of N type silicon 110 having surface 115 is attached to surface 105 of the substrate 100. The first layer can be formed, for example, by epitaxial growth or wafer to wafer bonding. After the first layer is formed resistors 30 and 31 are diffused into surface 115 (for clarity, only resistor 31 is shown). Next, a mask 120 is placed on surface 115. The mask will prevent etching of surface 115 during the next step. Surface 115 is then etched using, for example, a timed Potassium Hydroxide (KOH) etchant. Any area of surface 115 not covered by the mask 120 is etched away. The structure after this etch is shown in FIG. 2C.

As a final step, a portion of substrate 100 is etched away producing the device shown in FIG. D. The support rim 8, constraint 10, diaphragm 15, boss 21, rib 31 and resistor 41 can now be seen from this side view. As depicted in FIG. 2D, rib 31 is shown as being of the same thickness as boss 21. This is merely exemplary of one construction since as was stated earlier the rib can have any thickness as long as it is no thicker than the boss.

Figure 3A:
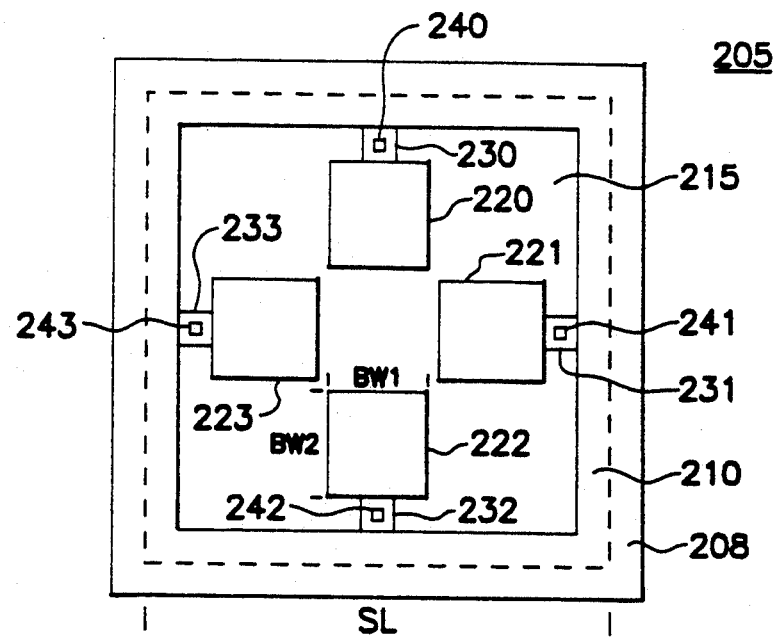
FIGS. 3A is an alternative embodiment of the pressure transducer of FIG. 1A.

In FIG. 3A, an alternative embodiment of a pressure transducer 205 is shown having a support rim 208, constraint 210, a diaphragm 215, four bosses 220, 221, 222, 223 and four ribs 230, 231, 232, 233 and four resistors (not shown). The pressure transducer 205 is identical to the pressure transducer 5 in every way except that pressure transducer 205 has two more bosses, ribs and resistors.

Figure 3B:
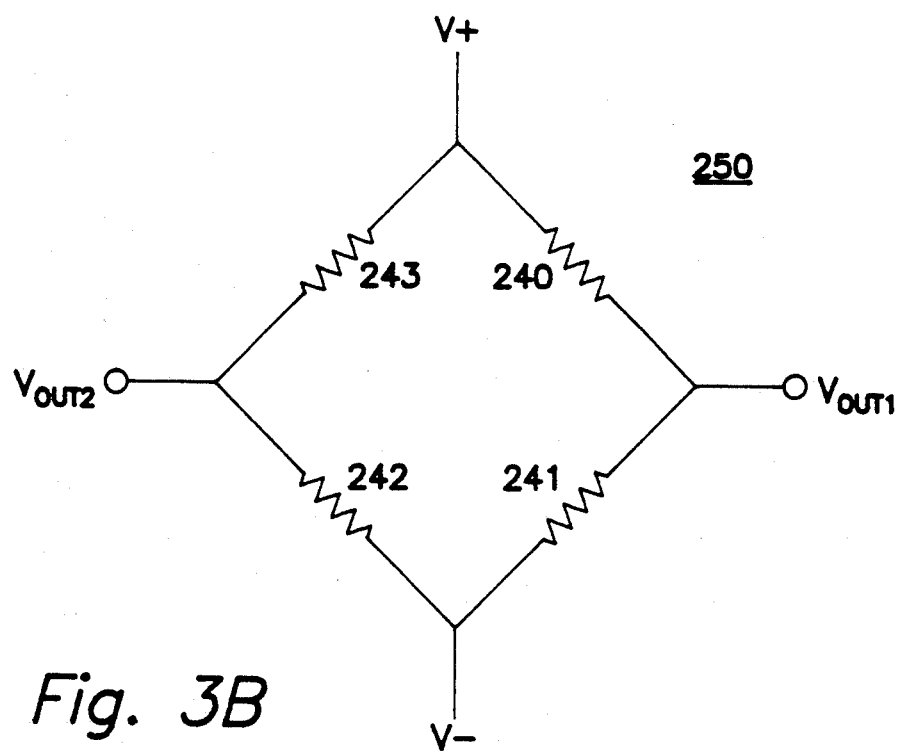
FIG. 3B shows the resistors of FIG. 3A connected in a full bridge arrangement.
Figure 3C:
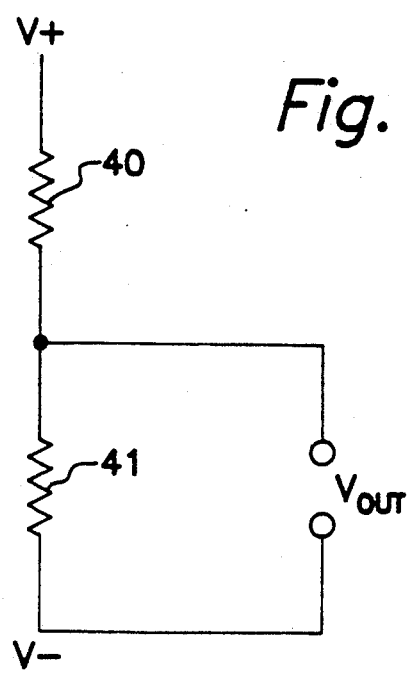
FIG. 3C shows a half bridge arrangement of resistors in a pressure transducer.

As has been previously noted, where four resistors have been formed, the resistors can be connected in a full bridge arrangement shown in FIG. 3B. The full bridge 250 has voltage supply ports and voltage output ports. A half bridge consisting of two resistors is shown in FIG. 3C. The half bridge arrangement may be used where the pressure transducer has only two resistors.

The operation of the transducer will now be described. The constraint provides a rigid support for the diaphragm, the bosses and the ribs. The diaphragm collects the moments caused by the difference in pressures on the two sides of the diaphragm, and applies it through the boss to the rib.

The rib is kept thicker than the diaphragm, but as short and narrow as possible while still leaving space for a piezoresistor of a desired resistance. Thickness is important to keep the piezoresistors off the neutral axis of the diaphragm (it is desirable to form the piezoresistors as close to one of the surfaces of the rib as possible to further improve sensitivity). The thickness, shortness and narrowness of the rib also helps to concentrate the stress caused by deflection of the diaphragm, on the rib. Ideally, the rib would provide the entire support for the diaphragm, although in practice, the diaphragm itself provides a large portion of its own support.

The boss provides a region which ideally is thick enough so that it does not undergo any bending or stretching when the diaphragm is deflected due to a pressure difference. Once again, in practice, the boss does undergo some stretching and bending. The boss, when attached to the relatively narrow rib, serves to better collect the moments caused by deflection of the diaphragm thereby improving sensitivity. If the rib is also short relative to the boss, the linearity of the device is improved since the boss is close to the constraint which reduces stretching of the diaphragm and loss of stress at the piezoresistor. In summary, it is the prevention of stretching at the piezoresistors using bosses and ribs and the collection of the moments at a point using the bosses and ribs which increase the linearity and the sensitivity respectively.

Figure 4A:
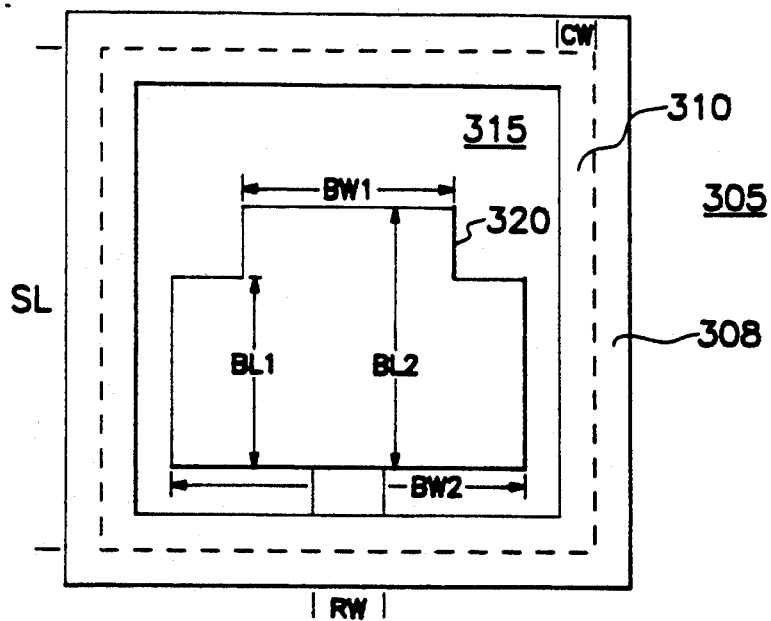
FIGS. 4A-C show three preferred embodiments of the present pressure transducer having a first modified boss shape.

In order to further improve the linearity and sensitivity of the device, special boss shapes can be employed. Referring now to FIG. 4A, thereshown is a pressure transducer having a constraint with a side length of SL and a "Hat Shaped" boss having first and second boss widths, BW1, BW2 and first and second boss lengths BL1 and BL2. For the single boss configuration of FIG. 4A, BW2 should be greater than one-third SL, BW1 should be less than or equal to BW2, BL2 should be less than nine-tenths SL, and BL1 should be less than BL2.

Figure 4B:
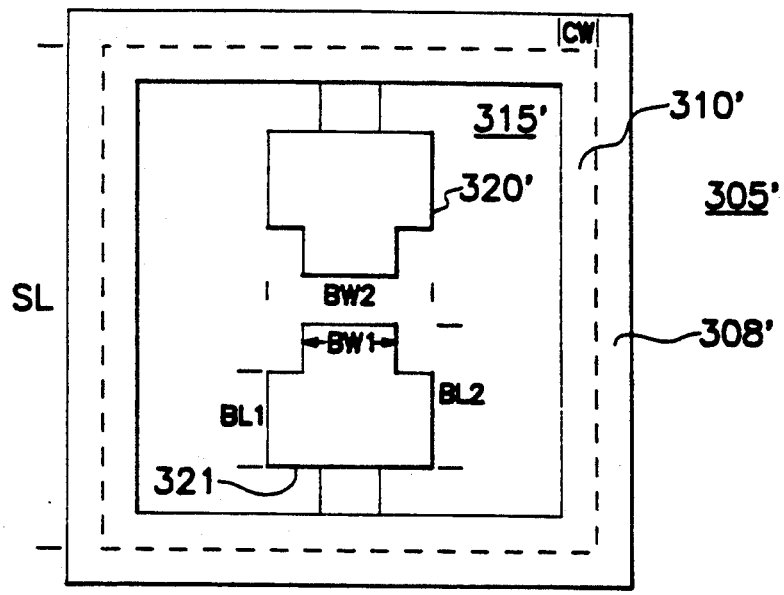
Figure 4C:
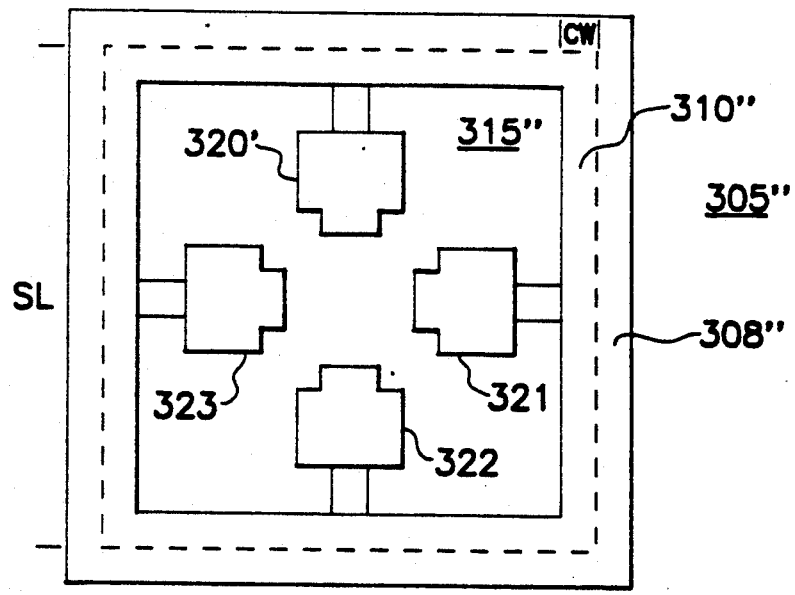
Figure 5C:
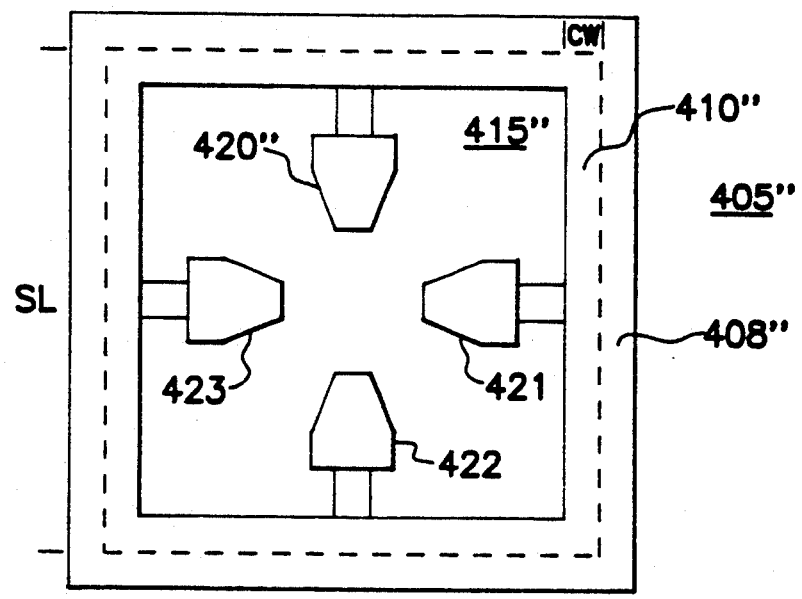
Figure 7A:
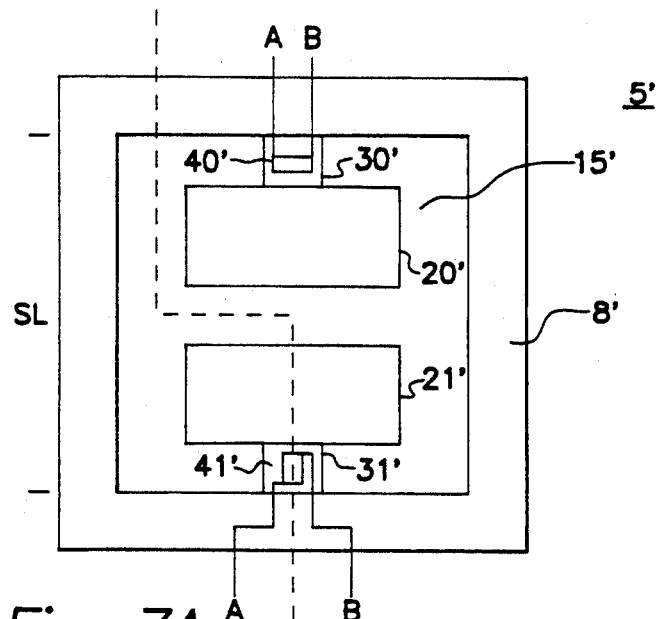
FIGS. 7A-D show the device of FIGS. 1A-D without the constraint.
Figure 7B:
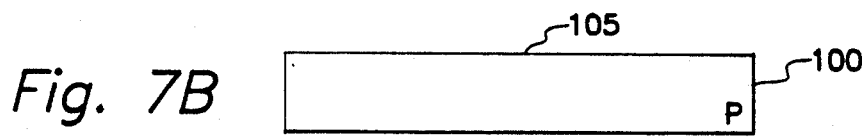
Figure 7C:
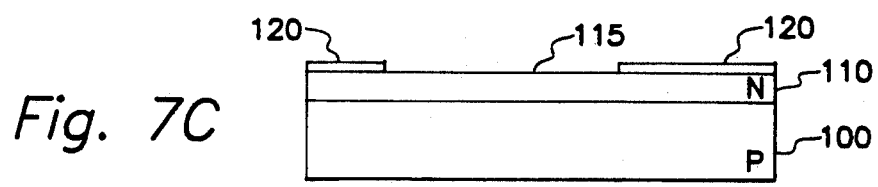
Figure 7D:
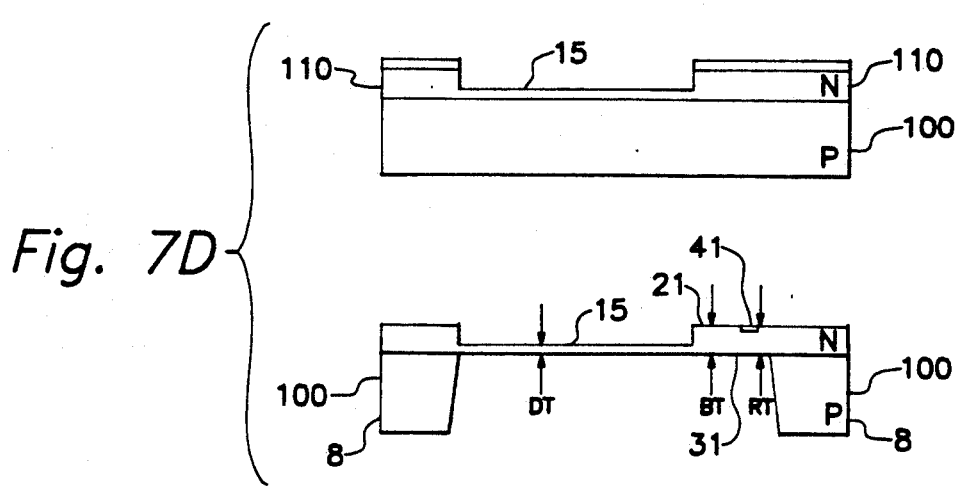

Shown in FIGS. 4B and 4C, are two and four boss configurations using the Hat Shaped boss shown in FIG. 4A. For these configurations, BW2 > $\frac{1}{3}$SL and BW1 < = BW2 as before. However, for this arrangement, BL2 < = $\frac{1}{3}$SL and BL1 < = BL2.

Figure 5A:
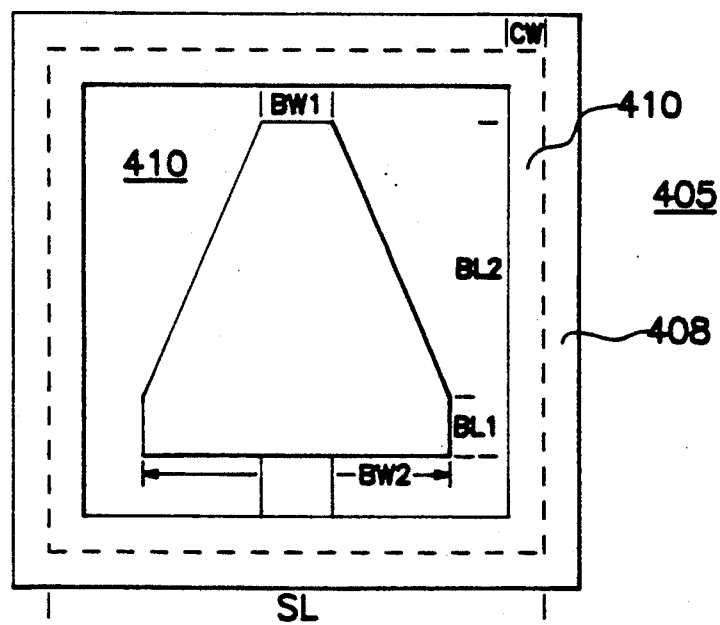
FIGS. 5A-C show three preferred embodiments of the present pressure transducer having a second modified boss shape.
Figure 5B:
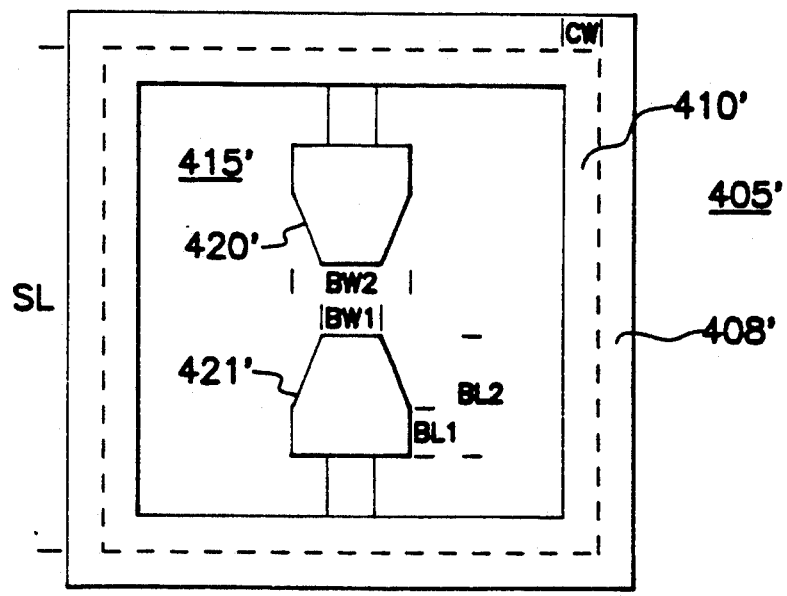

FIGS. 5A, B and C show another different boss shape which is a substantially equilateral prism. The relationships described in connection with FIG. 4A apply to the device of FIG. 5A while the relationships discussed in connection with FIGS. 3B and C apply to the devices shown in FIGS. 5B and C.

Lastly, FIGS. 7A-D show the pressure transducer of FIG. 1A without the constraint 10. It is important to note that inclusion of the boss and rib arrangements alone, without the constraint, provide the above mentioned significant performance advantages over pressure transducers of the prior art. Also note, that the rim has a side length of L in this case.

One example of a pressure transducer which has worked well would be the transducer of FIG. 4B or 4C where: $BW1 = 800 \times 10^{-6}$ meters, $BW2 = 1200 \times 10^{-6}$ meters, BL1 = 150×10⁻⁶ meters, BL2 = 300×10⁻⁶ meters, SL = 1700×10⁻⁶ meters, RW = 100×10⁻⁶ meters, CW = 10×10⁻⁶ meters, DT = 6×10⁻⁶ meters, RT = 10×10⁻⁶ meters, CT = 10×10⁻⁶ meters, RL = 40×10⁻⁶ meters and BT = 20×10⁻⁶ meters.

The foregoing has been a description of a novel and non-obvious pressure transducer design. The applicant does not intend that the extent of his invention be defined by the foregoing description, but instead defines his invention through the following appended claims.

I claim:

1. A piezoelectric pressure transducer, comprising:
   a support rim;
   a constraint connected to said support rim having a central region and sides of length L;
   a diaphragm of a first thickness connected to said central region;
   one or more substantially polyhedral bosses, each of said bosses being connected to said diaphragm and having a second thickness, a first boss length and first boss width, said first boss length being less than 0.9 L; and
   two ribs of a third thickness less than or equal to the second thickness but greater than the first thickness, each of said ribs being connected to a preselected one of said bosses and to said constraint and having a piezoresistor formed therein.

2. The pressure transducer of claim 1, wherein:
   there are four of said bosses;
   a first width of a first of said bosses is greater than one third L, and a first length of said first of said bosses is less than or equal to one third L.

3. The pressure transducer of claim 1, wherein:
   one of said bosses is formed as a trapezoidal prism having first and second widths and first and second lengths, said second length being less than said first length.

4. The pressure transducer of claim 3, wherein:
   said second length is less than or equal to said first length; and
   said second width is less than said first width.

5. The pressure transducer of claim 3, wherein:
   there are four of said bosses;

6. The pressure transducer of claim 1, wherein:
   at least one of said two bosses has a hat shape.

7. A pressure transducer, comprising:
   a support rim having a central region and sides of length L.;
   a diaphragm of first thickness connected to said rim;
   two substantially polyhedral bosses, each of said bosses having a second thickness, each of said bosses being connected to said diaphragm and having a first length and first width, said first length being less than 0.9 L; and
   a rib of a third thickness less than or equal to the second thickness but greater than the first thickness, said rib being connected to a preselected one of said bosses and said support rim and having a piezoresistor formed therein, said piezoresistor being adapted to change resistance in response to a deflection of said preselected one of said bosses.

8. The pressure transducer of claim 7, wherein:
   the first width is greater than one third L, and the first length is less than or equal to one third L.

9. The pressure transducer of claim 7, wherein:
   there are four of said bosses:
   the first width is greater than one third L, and the first length is less than or equal to one third L.

10. The pressure transducer of claim 7, wherein:
    one of said bosses is formed as a substantially trapezoidal prism having a second width and a second length, said second length being less than said first width.

* * * * *